US008715593B2

(12) United States Patent
Brewer

(10) Patent No.: US 8,715,593 B2
(45) Date of Patent: May 6, 2014

(54) PIPETTE TIPS FOR EXTRACTION, SAMPLE COLLECTION AND SAMPLE CLEANUP AND METHODS FOR THEIR USE

(76) Inventor: William Brewer, Columbia, SC (US)

( * ) Notice: Subject to any disclaimer, the term of this patent is extended or adjusted under 35 U.S.C. 154(b) by 667 days.

(21) Appl. No.: 12/525,546

(22) PCT Filed: Feb. 21, 2008

(86) PCT No.: PCT/US2008/054584
§ 371 (c)(1),
(2), (4) Date: Aug. 2, 2009

(87) PCT Pub. No.: WO2008/103828
PCT Pub. Date: Aug. 28, 2008

(65) Prior Publication Data

US 2010/0081209 A1 Apr. 1, 2010

Related U.S. Application Data

(60) Provisional application No. 60/902,463, filed on Feb. 21, 2007, provisional application No. 60/987,578, filed on Nov. 13, 2007.

(51) Int. Cl.
*B01D 15/00* (2006.01)
*B01L 3/02* (2006.01)

(52) U.S. Cl.
USPC ........... 422/527; 422/501; 422/524; 422/525; 422/511; 422/512; 422/513; 422/534; 422/535; 422/570; 73/864; 73/864.01; 73/864.11; 73/864.74

(58) Field of Classification Search
USPC ......... 422/524–525, 513, 527, 534–535, 570, 422/500–501, 511–512; 73/863.32, 864, 73/864.01, 864.02, 864.03, 864.11, 73/864.14, 864.74
See application file for complete search history.

(56) References Cited

U.S. PATENT DOCUMENTS

| | | | | | |
|---|---|---|---|---|---|
| 5,171,537 | A | * | 12/1992 | Wainwright et al. | 422/514 |
| 5,437,979 | A | * | 8/1995 | Rampal et al. | 435/6.16 |
| 5,496,523 | A | * | 3/1996 | Gazit et al. | 422/513 |
| 5,580,529 | A | * | 12/1996 | DeVaughn et al. | 422/525 |
| 5,833,927 | A | * | 11/1998 | Raybuck et al. | 422/513 |
| 6,143,252 | A | * | 11/2000 | Haxo et al. | 506/40 |
| 6,455,325 | B1 | * | 9/2002 | Tajima | 436/526 |
| 6,566,145 | B2 | * | 5/2003 | Brewer | 436/178 |

(Continued)

OTHER PUBLICATIONS

Young, International Search Report, PCT/US08/54584, Jun. 27, 2008.

*Primary Examiner* — Brian R Gordon
(74) *Attorney, Agent, or Firm* — Sara C. Kanos; Nexsen Pruet, LLC

(57) ABSTRACT

The present invention is a pipette tip device for extraction of liquid, semi-solid or solid solutions to be chemically analyzed and the methods for their use. The pipette tip extraction device contains a screen or filter at its lower narrow end to contain solid particulate matter and a barrier at its upper wide end. The optional upper frit is to be made of material that permits liquid solutions to flow through it. In addition to the barrier and screen, the pipette tip extraction device may contain solid-phase sorbent. Through the use of a removable cap, the pipette extraction tip may also serve as a sample collection container or tip in which samples can be delivered to the top of the tip (e.g., for direct collection of samples, including solid samples). A new method for DPX extraction using liquid-liquid-solid-phase extraction is also disclosed.

9 Claims, 9 Drawing Sheets

(56) References Cited

U.S. PATENT DOCUMENTS

| | | | | |
|---|---|---|---|---|
| 6,692,703 | B2 * | 2/2004 | Shoji et al. | 422/527 |
| 6,761,855 | B1 * | 7/2004 | Cook et al. | 422/70 |
| 7,227,018 | B2 * | 6/2007 | Shoji et al. | 536/25.41 |
| 7,785,466 | B1 * | 8/2010 | Smith | 210/321.75 |
| 2003/0007897 | A1 * | 1/2003 | Creasey | 422/100 |
| 2003/0039589 | A1 * | 2/2003 | Smith | 422/100 |
| 2005/0045543 | A1 | 3/2005 | Gjerde et al. | 210/198.2 |
| 2005/0169800 | A1 | 8/2005 | Bianca | 422/61 |

* cited by examiner

PIPETTE TIPS FOR EXTRACTION, SAMPLE COLLECTION AND SAMPLE CLEANUP AND METHODS FOR THEIR USE

This application claims priority from U.S. Provisional Application Ser. No. 60/902,463, filed 21 Feb. 2007, and Ser. No. 60/987,578, filed 13 Nov. 2007, both of which are incorporated in their entirety herein.

FIELD OF INVENTION

The present invention relates to an extraction and/or sample collection device used during sample preparation for chemical analysis.

BACKGROUND

Numerous types of sample preparation devices for chemical analysis have been developed that utilize pipette tips. The main advantage for using pipette tips is that they may be readily used with automated robotic liquid handlers. All of these available tips focus on the processing of liquid sample solutions that draw solutions in and out of the narrow bottom end of the pipette tips. Furthermore, all of these products are only amenable to low pressure applications. These tips cannot utilize small particle size sorbent with very high surface areas because these cause high back pressure. None of these inventions introduce solutions through the top wide opening end of the pipette tips.

Unfortunately, these inventions are not effective for analyzing viscous liquid sample solutions such as whole blood. None of these devices are capable of processing semi-solid samples such as waste water or tissue homogenate without some sort of sample pre-treatment such as protein precipitation, centrifugation or filtration. Furthermore, none of these pipette tip devices can be used for directly analyzing solid samples.

There exists a need for a pipette tip device that can be used to process liquid, semi-solid and solid sample solutions for chemical analysis.

SUMMARY OF INVENTION

According to its major aspects and broadly stated, the present invention is a pipette tip device for the extraction of liquid, semi-solid or solid solutions to be chemically analyzed and the methods for their use. The pipette tip extraction device contains a screen or filter at its lower narrow end to contain solid particulate matter and a barrier at its upper wide end. This barrier may be referred to as either a frit, an adaptor, a cap or a fitting and may be used interchangeably. The upper frit is to be made of material that permits liquid solutions to flow through it, and the upper frit may be optional and replaced with other fittings at the top of the DPX tip such as a removable cap, an adaptor, a luer lock fitting, a 2- or 3-way (or multiple port) valve fitting, an o-ring fitting, or septum cap.

The adaptor may also be designed to facilitate the movement of the pipette tip on robotic instrumentation. By incorporating grooves on the outside of the adaptor, a robotic gripper can pick up the tip and move it to various locations such as sample tubes and vials. The inside of the adaptor is designed to make an air tight seal with a syringe needle so that liquid solvents and gases can be aspirated and dispensed with relatively high pressures. Furthermore, the adaptor may contain a thin film to provide a seal to contain material inside of the tip prior to sample processing.

In addition to the barrier and screen, the pipette tip extraction device may contain solid-phase sorbent. In this case, the pipette extraction tip is an improved disposable pipette extraction (DPX) tip, with the ability to introduce solvent and sample solutions to its top wide opening end. The sorbent may be small particle size such as 5-20 microns in diameter, providing unsurpassed extraction efficiency. The use of such small particle size requires high pressure (HP), and these HP-DPX tips therefore require the use of adaptors to provide high pressure applications. The sorbent can also contain optional additives, for example, buffers or buffer salts, to aid in the processing of the sample.

In addition to HP-DPX tips, other sorbents may be used to extract and remove unwanted sample matrices to "clean up" solutions, called DPX-CU. Other sorbent materials include antibodies for immunoaffinity applications (DPX-IA), functionalized groups for cation exchange (DPX-CX) and anion exchange (DPX-AX) applications, and porous materials for molecular weight separations (DPX-MW).

Another application of DPX is sample preparation for liquid chromatography (DPX-LCprep). These tips have a dual purpose of extracting unwanted compounds as well as filtering particulate matter. The DPX-LCprep tips are used to protect HPLC columns to extend their lifetimes and improve chromatographic separations.

Through the use of a removable cap, the pipette extraction tip may also serve as a sample collection container or tip (SC-Tip) in which samples can be delivered to the top of the tip. In this case the pipette extraction tip can be used in the field for direct collection of samples, including solid samples. The screen of the SC-Tip is used as a filtration medium to remove and filter particulate matter that may be present following the extraction process. This represents the only application of pipette extraction devices that may be used for directly processing solid samples.

A new method for DPX extraction using liquid-liquid-solid-phase extraction is also disclosed. This unique method of extraction will greatly extend analyte extractions and applications.

Other features and advantages of the present invention will be apparent to those skilled in the art from a careful reading of the Detailed Description of a Preferred Embodiment Accompanied by the following drawings.

DETAILED DESCRIPTION OF THE INVENTION

Numerous new sorbent materials have been recently developed, and use of these materials as sorbents vastly extend the capabilities of DPX methodology. Also, modifications to the DPX design must be incorporated in order to use many of these materials for DPX applications.

A major improvement to DPX is the development of high performance SPE by using small particle size sorbent material. These DPX tips are referred to as high performance DPX, or HP-DPX. The small particle size materials range up to 200 microns in diameter, preferably up to 100 microns, with a more preferred range of 5-40 microns and most preferred range of 5-20 microns. Use of these materials create higher back pressures and therefore require relatively higher pressures to perform extractions. HP-DPX tips can therefore not be simply press fitted onto standard pipettes to accomplish these extractions. Greater amounts of force then used with conventional pipettes for standard tips are required to move solutions in and out of the HP-DPX tips. For example, a 1 mL volume pipette (or syringe) can not be readily used with a 1 mL HP-DPX tip; instead, a 5 mL volume syringe or pipette device is required. For a 5 mL HP-DPX tip, a 10 or even 25 mL syringe device is required to effectively extract solutions.

Another feature that makes these HP-DPX tips unique is that the mixing of the solutions with many of these materials creates a "gel"; ie, the solution is homogenous and therefore provides unsurpassed extraction efficiencies and rapid equilibrations. The unique mixing of HP-DPX makes these particular materials ideally suited for DPX technology. One way of readily accomplishing this mixing is by aspirating air or another gas into the DPX tips, and this air flow causes the formation of small bubbles that cause a perturbation of the sample solution resulting in thorough mixing. This method of mixing is readily amenable to robotic liquid handlers.

Figure 1:
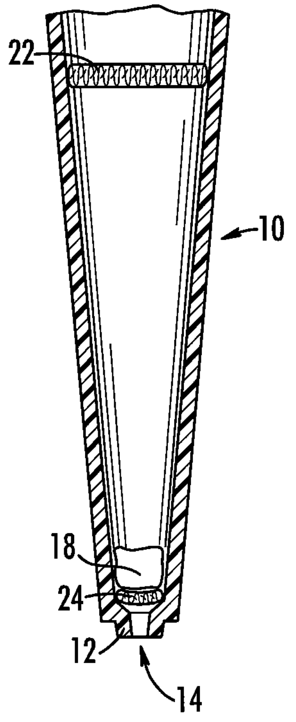
FIG. 1 shows a cross-section schematic diagram of a HP-DPX tip.

In FIG. 1, a schematic of the HP-DPX tip is shown. The cross-section schematic diagram of an HP-DPX tip indicates an optional second frit (upper barrier, 22) composed of a liquid permeable membrane and loosely contained small particle size (such as 5 to 40 microns in diameter) sorbent material or other functionalized sorbent particles (18). The void (10) indicates the mixing chamber of DPX, and the bottom (12) of the tip contains an opening (14) with a proximate screen or frit (24) that contains very small openings or pores (such as 2 or 5 or 10 microns in diameter). The screen (24) may be composed of stainless steel, porous polymeric material, porous glass, porous ceramic, or other similar materials. The major improvements to this device is that different sorbent materials are disclosed and the upper frit (barrier) is made to be liquid permeable and is optional. Various sorbent materials include styrene divinyl benzene, sdvb (5-40 microns in diameter), and functionalized sdvb containing, for example, hydroxylated or sulfonated or aminated groups; primary secondary amine (psa); amino propyl or amino alkyl groups; alumina (basic, acidic or neutral); florisil; small particle size silica gel; $C_8$, $C_{18}$ and functionalized $C_8$ or $C_{18}$ material; $Na_2SO_4$, $MgSO_4$ or $CaSO_4$ (for drying); diatomaceous earth; sephadex; and polyethylene.

Figures 2A, 2B, 2C, 2D, 2E:
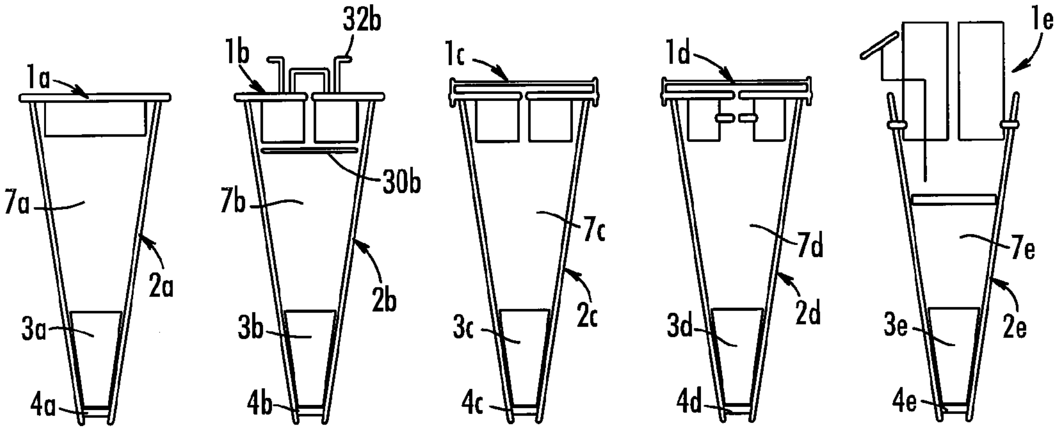
FIG. 2 shows schematic diagrams of cross-sections of several caps or adaptors or fittings that can be used with a syringe device for connection to the top of the HP-DPX tip.

The use of small particle size sorbent material drastically improves recoveries and extraction efficiencies, but an adaptor or cap or fitting at the top of the DPX tip is required to securely connect these tips to perform the extractions. The adaptor or cap or fitting, which it can be referred to as either, may be composed of plastic, metal or rubber, and can be disposable or reusable. With this tighter fit with the adaptor, the higher pressures don't cause the tips to "pop" off or become dislodged. In FIG. 2A, a schematic of a device including an adaptor (1*a*) that is a septum (A), a pipette tip (2*a*), sorbent or sample (3*a*), a liquid permeable closure (4*a*), and a void (7*a*) is shown. In FIG. 2B, a schematic of a device including an adaptor (1*b*) that is a Luer lock fitting, a seal (30*b*), a pipette tip (2*b*), sorbent or sample (3*b*), a liquid permeable closure (4*b*), a void (7*b*) or luer lock fitting adaptor (B) is shown. In this case, a syringe needle or syringe can be used to pierce the septum or connect directly to the adaptor, respectively. In FIG. 2C, a device is shown including, an adaptor (1*c*) that can also be used that forms to form a friction seal with a syringe needle, a pipette tip (2*c*), sorbent or sample (3*c*), a liquid permeable closure (4*c*), and a void (7*c*). In FIG. 2D, a schematic of a device is shown including an adaptor (1*d*) that is an o-ring seal that can be used to provide a seal for a syringe needle, a valve, Luer lock fitting or any other similar fitting, a pipette tip (2*d*), sorbent or sample (3*d*), a liquid permeable closure (4*d*), and a void (7*d*). Finally, in FIG. 2E a schematic of a device is shown including an adaptor (1*e*). The pipette tip (2*e*), sorbent or sample (3*e*), a liquid permeable closure (4*e*), and a void (7*e*). The the adaptor may contain a separate line for addition of liquid solvents (or gas) to the top of the DPX tip, and in this case a frit is shown to contain the sorbent (or sample) inside of the tip.

Figure 3:
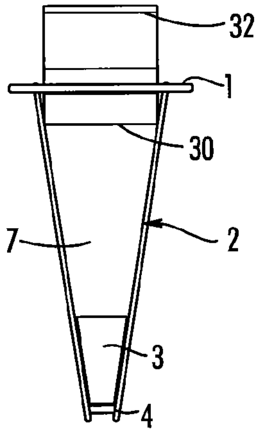
FIG. 3 shows a schematic diagram of a preferred embodiment of the pipette tip device.

All of these adaptors can be modified to be used as transport adaptors for liquid robotic handlers. They may also contain a seal (30) or thin film so that they can be used as a cap to contain the contents inside of the tip, and the film can subsequently be penetrated in order to affect extraction methods. Also, all adaptors may be screw cap for easy closing and opening of the tips. In FIG. 3, a preferred embodiment of the adaptor is shown. The parts of the device include the adaptor (1), the pipette tip (2), the sorbent or sample (3), the void (7) and the liquid permeable closure (4). The adaptor is designed to form an air tight seal with a positive or negative pressure device, such as a syringe, and to facilitate movement for a robotic liquid handler as well as a cap to contain the contents within the pipette tip. Its key features are grooves (32) and ridges for securely attaching to a robotic instrument device, it can withstand high pressures for HP-DPX applications, it has a thin film (30) for containing material within the pipette tip device, and it has the ability to be removed as a cap for opening and closing the pipette tip device for sample collection (SC-Tip applications).

With these types of adaptors, the upper frit is not required because the septum or adaptor serves to contain the loose sorbent particles inside of the DPX tip. Hence, the upper frit is optional. Without the presence of the frit, it is much easier to add solutions such as elution solvent to the "top" of the DPX tip.

It has been determined that in some applications and methods, solutions added to the top provide better results. In the original DPX design, the upper barrier was indicated to be impermeable to liquid solutions, but this original design did not incorporate methods that added solutions to the top of the DPX tips. For example, elution using 5:1 hexanes-ethyl acetate for the analysis of THC (tetrahydrocannabinol, the active ingredient of marijuana) and its metabolites from whole blood is best performed when adding the elution solvent to the top of the DPX tip instead of drawing from the bottom. Elution from the bottom refers to drawing solution from the narrow end of the DPX tip (position 14 of FIG. 1), and elution from the top refers to adding elution solvent from the position of the adaptor (FIG. 2) at the "top" of the DPX tip.

Figure 4A:
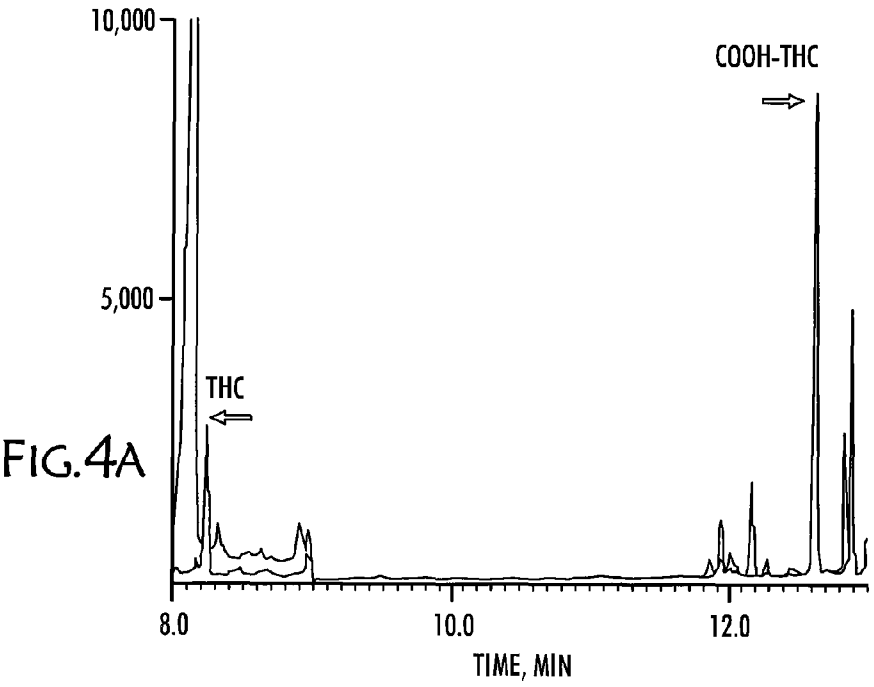
FIG. 4 shows chromatograms (GC/MS) of DPX extracts of tetrahydrocannabinol (THC) and carboxy-THC (COOH-THC).
Figure 4B:
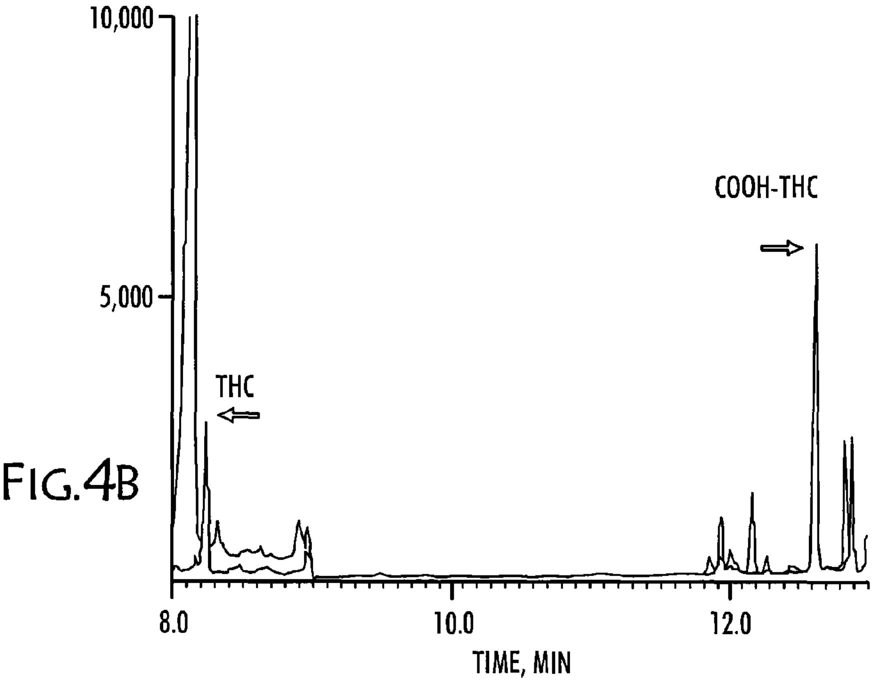

In FIG. 4, GC/MS chromatograms of THC and its principle metabolite, COOH-THC, are shown following DPX extraction using elution solvent from the bottom (B) and elution from the top (A). (Note: all chromatograms in this application show intensity counts vs. time.) In this example, the upper barrier was made of a porous polymeric material that allows for liquid solutions to pass through without interferences. The peak representing COOH-THC is much greater in intensity with elution from the top. The necessity for adding elution to the top is more noticeable with the use of HP-DPX tips, where the higher surface area causes retention of analyte when elution solvent is being passed back through the sorbent when eluting from the bottom, resulting in lower recoveries.

In order to facilitate the addition of solvent to the top of DPX tips, the adaptor uses a 3-way (or multi-) valve. This enables solvent to be readily added to the top without the need for disconnecting the DPX tips from the syringe device or pipette.

The use of other sorbent materials has been found to be useful for the detection of basic drugs. These compounds may be acidified and then extracted using cation exchange (DPX-CX) mechanisms. Similarly, this may be performed for the extraction and analysis of acidic drugs (or compounds), but these solutions are first made basic to make the compounds negatively charged, and these are subsequently extracted using DPX tips with anion exchange sorbent (DPX-AX).

Other DPX sorbent materials may also involve the use of various pore sizes for extracting and separating analyte based on molecular weight or size or shape. These DPX tips are referred to as DPX-MW.

Finally, DPX tips may also contain antibodies (or other proteins) immobilized on sorbent particles for the selective extraction of various analyte. These DPX tips are referred to as DPX-IA for immunoaffinity. The use of DPX-IA makes it possible to selectively extract a particular analyte in just seconds, and the use of the DPX design permits the analyte to rapidly mix and bind to the antibodies, separate the analyte from the sample matrix, and elute the analyte of interest for analysis. These DPX-IA tips may find wide practice for use in diagnostic tests, such as ELISA (enzyme linked immunosorbent assay), FPIA (fluorescene polarization immunoassay), EIA (enzymatic immunoassay), RIA (radioactive immunoassay), or other similar diagnostic techniques based on immunoaffinity technology. With DPX-IA, screening methods may be performed at a much faster rate than currently achieved using standard plates.

DPX methods in its original design focused on the extraction of analytes of interest. However, analysis of chemicals in various sample matrices is problematic due to high amounts of sample matrix components. These matrix compounds may cause interferences that obscure both qualitative and quantitative analytical data. An example is the presence of fatty acids in grain products or liver specimens. A new and improved feature of DPX is for the extraction of sample matrix interferences for use in cleanup steps, and these are referred to as DPX-CU (for cleanup). The DPX-CU procedure may use a weak or strong anion exchange (SAX) resin to remove fatty acid components. Other possible sorbent material for DPX-CU include polyamino, primary secondary amine (PSA), amino-alkyl groups, florisil, alumina (neutral, basic or acidic), silica gel, modified silica gel, molecular imprinted polymers, specific affinity type materials (such as antibodies, proteins or immobilized compounds to remove specific proteins), sephadex, varying pore size polymers, and anion exchange and cation exchange sorbent materials.

The methods used for DPX-CU are very fast, taking approximately 30 seconds or less to achieve, typically as short as 10 seconds. This rapid speed is due to the fact that the solutions are either drawn in and out of the tip or simply dispensed through the top of the tip to remove the interferences, so separate wash and elution steps are not required.

Another improvement to DPX is for its use as a device for preparation for HPLC analysis, referred to as DPX-LCprep. In HPLC analysis, the solutions to be injected into the chromatograph are first subjected to a filtration process. This is done to ensure the removal of particulate material that may clog and damage the HPLC column and instrumentation. Furthermore, a HPLC guard column is typically employed to prevent contamination of the chromatographic column. These guard columns contain solid-phase particles (sorbent) that are identical or very similar to the stationary phase of the HPLC column. Although the use of guard columns protects the HPLC column, they inevitably cause some loss of resolution. The concept for the use of guard columns is that any compound that irreversibly binds to the stationary phase material of the HPLC column would first bind to the guard column (often referred to as the pre-column). After several analyses, the packing and the screens in the guard column are replaced in order to provide optimal chromatographic performance. Often, loss of performance is first noted and is used as an indicator or early warning that the guard column needs to be replaced. A much better approach is to incorporate a disposable guard column that protects the HPLC column and ensures each analysis is reproducible.

With DPX-LCprep, the tips are used to serve as both a disposable guard column and filtration device. The DPX-LCprep tips can be composed of the same type packing as the HPLC column, such as $C_{18}$ or similar phase, and this ensures that any contaminants in the solution that may irreversibly bind to $C_{18}$ is removed from the solution by binding to the sorbent contained in the DPX-LCprep tip. The bottom frit (screen) is liquid permeable and also acts as a filtration device, ensuring that particulate material is removed from the solutions. These DPX-LCprep tips are to be used by introducing the sample solutions to the top, thereby permitting the use of the bottom frit to act as a filtration device.

Figure 5:
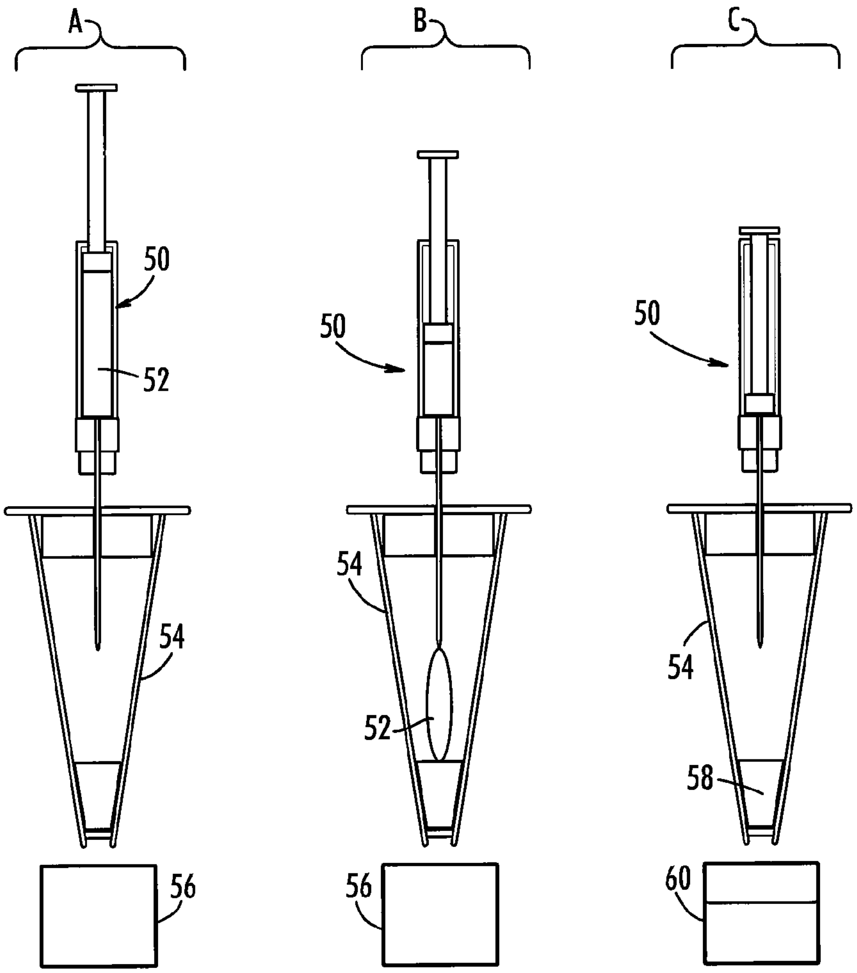
FIG. 5 shows a schematic diagram demonstrating the steps involved in DPX-LCprep.

In this case, the DPX-LCprep sorbents are not to be mixed with the sample solution, but rather the solution is pushed through from the top. An example of the steps used for this process is shown in FIG. 5. Step A involves injecting the sample solution 52 with a syringe 50 into the DPX-LCprep tip 54. Step B involves dispensing the sample solution through the DPX-LCprep tip into an empty vial 56. The final step C involves collecting the clean and filtered sample solution in a vial 60, where sample matrix components are retained on the sorbent 58.

Figure 6:
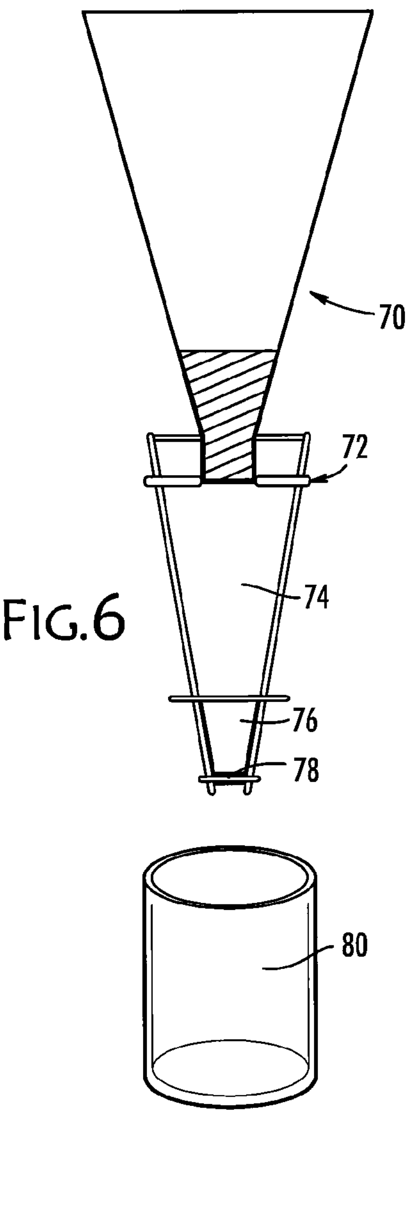
FIG. 6 shows a schematic diagram of the tandem use of HP-DPX with DPX-LCprep to encompass rapid DPX extraction of analytes followed by the use of a disposable guard cartridge and filtration.

In FIG. 6, a schematic diagram of the tandem use of HP-DPX with DPX-LCprep to encompass rapid DPX extraction of analytes followed by the use of DPX-LCprep for a disposable guard column (or cartridge) and filtration is shown. This also demonstrates the feasibility for automation of these procedures. The schematic shows a HP-DPX tip 70 during the elution step; an adaptor seal 72 which connects the HP-DPX tip to a DPX-LCprep tip 74; conditioned LC media 76; a filtration screen 78; and the HPLC vial 80 for collecting the final "clean" eluent to be injected and analyzed. In this case, the adaptor 72 of the DPX-LCprep tip is designed to form a tight seal with another pipette tip and/or DPX tip. It is noteworthy that this procedure is readily automated.

Another key feature is that the DPX-LCprep tip may also act as a packed column which can be used to perform chromatography. Hence, the tip can be used as a chromatography medium which can be used to separate analytes for an inexpensive and portable method for chromatographic analysis. This is referred to as DPX-CHROM (for chromatography).

The method for performing DPX extractions may also be used to efficiently and rapidly perform liquid-liquid solid phase extraction. By mixing the sorbent with a particular solvent, the sorbent can subsequently be mixed with the sample solution. After a short equilibration time, the solution layers separate due to being immiscible and the sorbent settles into one of the layers (for example, the top organic layer). Choosing the solvent and sorbent to be immiscible with the sample solution will permit separation of phases without time-consuming centrifugation. Furthermore, there are no formations of emulsions that are common in liquid-liquid extractions. Also, the sorbent provides a clear indication of the separated layers. This liquid-liquid solid phase extraction is very unique and is ideally suited for use with DPX technology.

An advantage of the use of these adaptors is that they may also serve the purpose for permitting DPX tips to be used for sample collection containers (SC-Tips). The adaptors may serve as caps to contain samples collected, especially of forensic interest. The SC-Tips may contain absorbent material for liquid solutions, as well as anticoagulant or coagulants (and preservatives) for the collection of whole blood or serum, respectively. The SC-Tip may also include material to bind and extract the analytes or the sample matrix components (such as the DPX-CU tips).

The SC-Tips may be used for collection and processing solid samples such as powders suspected to be drugs or explosives. During conventional forensic chemical analysis of drugs, the samples are first transferred from the evidence container into a suitable container for chemical analysis, such as a test tube. The solid sample is then dissolved in a solvent. Subsequently, the dissolved solution is filtered to remove diluents and fillers. Then the solution is transferred into a vial and its contents analyzed. All of these steps can be performed much more readily and efficiently if the samples are placed inside of the SC-Tip. Through manual processing or automation, the contents inside the SC-Tip can be processed with solvent being drawn inside and mixed, and the solution can be rapidly and easily dispensed and filtered in one step. Robotic handling of the evidence prevents sample mishandling errors, reduces time for analysis, improves the integrity of the evidence by preventing contamination, and secures the chain-of-custody.

The SC-Tips offer the highest security and integrity of forensic evidence. If the evidence is placed inside of the SC-Tip during the original evidence collection, then the only direct handling of the evidence occurs at collection and during the chemical sample processing in the laboratory. The SC-Tips may be sealed with evidence tape after collection and then submitted to the forensic laboratory for analysis. The SC-Tips may contain bar code labels that uniquely identify the SC-Tip and its contents, either added during evidence collection or subsequently during evidence submission at the forensic laboratory. Further, the SC-Tips may be pre-weighed prior to collection in order to be subsequently weighed in order to make quantitative chemical analyses.

The following examples are intended to illustrate, and not limit, the invention disclosed herein.

EXAMPLES

Example 1

Figure 7A:
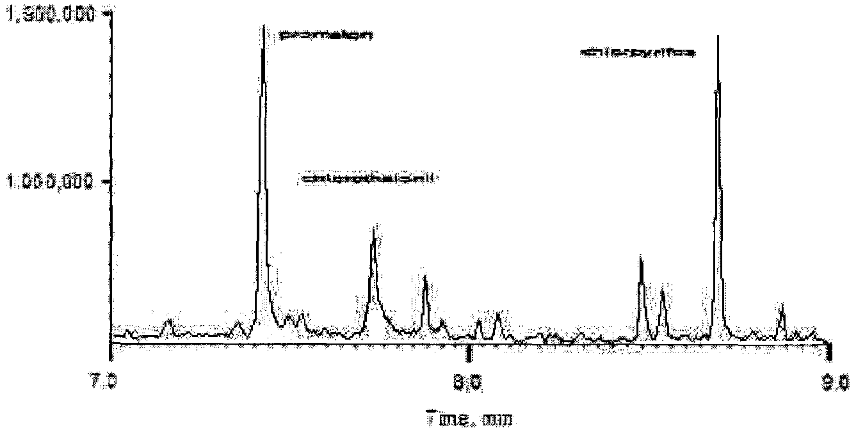
FIG. 7 shows GC/MS chromatograms of some common pesticides extracted from lettuce by DPX (B) and HP-DPX (A).
Figure 7B:
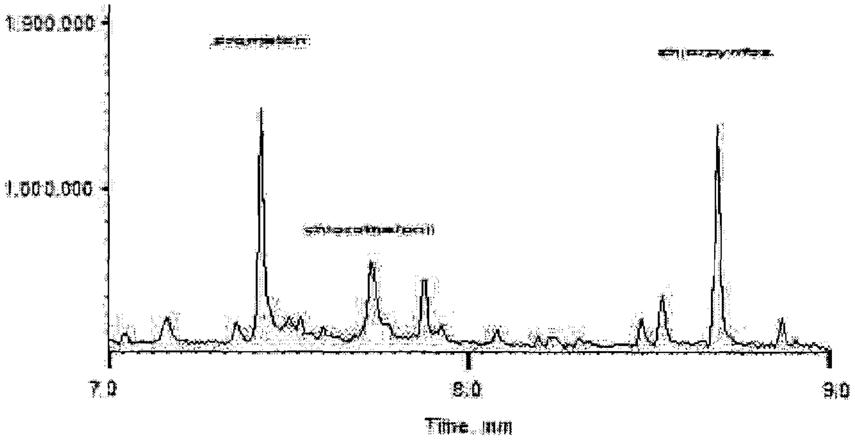

A comparison of recoveries of organophosphates (common pesticides, namely prometon, chlorothalonil and chlorpyrifos) extracted from blended lettuce extract using DPX and HP-DPX is shown in FIG. 7. The peaks in the GC chromatogram obtained following the use of HP-DPX (A) are much higher than those obtained by DPX (B). The higher recoveries are a result of the greater surface area of the smaller particle size material. It should be noted that these extractions were obtained by elution from the top using a 3-way valve adaptor.

Example 2

Figure 8:
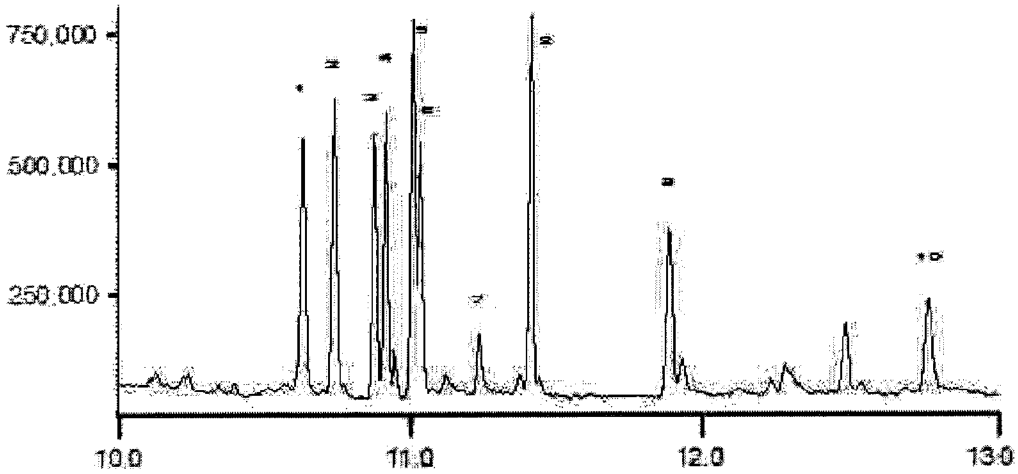
FIG. 8 shows a chromatogram (GC/MS) of basic drugs extracted from urine using DPX-CX.

An example of DPX-CX for the extraction of basic drugs from urine is shown in FIG. 8. The urine was spiked with a mixture of basic drugs at 0.5 ppm, with 0.2 mL extracted, and the resulting chromatogram is shown. All of the basic drugs were rapidly extracted in under 2 minutes and efficiently recovered (>90%) using the DPX-CX tips. The drugs analyzed were methadone (1), methaqualone (2), amitriptyline (3), cocaine (4), imipramine (5), doxepin (6), desipramine (7), SKF (an internal standard (8)), codeine (9) and oxycodone (10). With these tips, one method can be used to effectively extract and analyze practically any basic drug of interest. This example represents the fastest and most efficient method for extracting basic drugs from biological matrices.

Example 3

Figure 9:
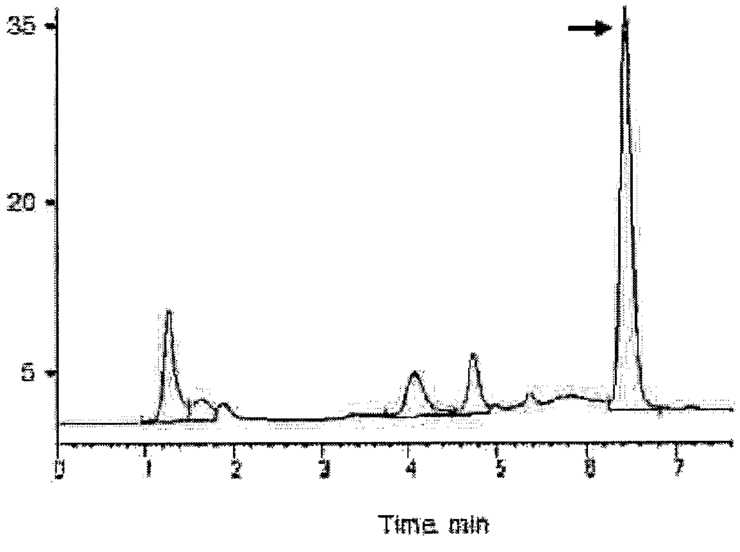
FIG. 9 shows an HPLC chromatogram (with fluorescence detection) recorded following DPX-IA extraction of 20 ppb aflatoxin $B_1$ (peak at 6.4 min) from corn meal.

An example of DPX-IA is exemplified by the HPLC chromatogram depicted in FIG. 9. HPLC chromatogram (with fluorescence detection) was recorded following DPX-IA extraction of 20 ppb aflatoxin $B_1$ (peak at 6.4 min) from corn meal. Aflatoxin $B_1$ is a highly toxic substance that is routinely screened in foods such as corn and corn based products. This extraction represents the most selective and fastest of its kind, taking less than 90 seconds to perform (following the blending of the sample). The addition of methanol (or acetone or other solvent) causes the antibody to denature and thus "release" the bound analyte. Due to the high selective binding of antibodies, negligible interference from sample matrix components occurs, even given the low concentration of analyte. The extraction, after blending the sample matrix with solvent, took much less time than the chromatographic analysis (with the peak at 6.4 min (arrow) being aflatoxin $B_1$.

Example 4

Figure 10A:
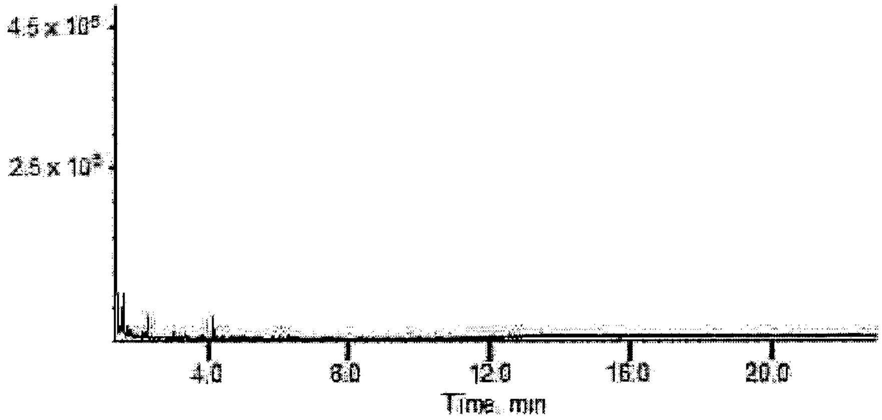
FIG. 10 shows chromatograms (GC/MS) of blank stomach contents (feed) extracted by DPX with (A) and without (B) a clean up step by DPX-CU.
Figure 10B:
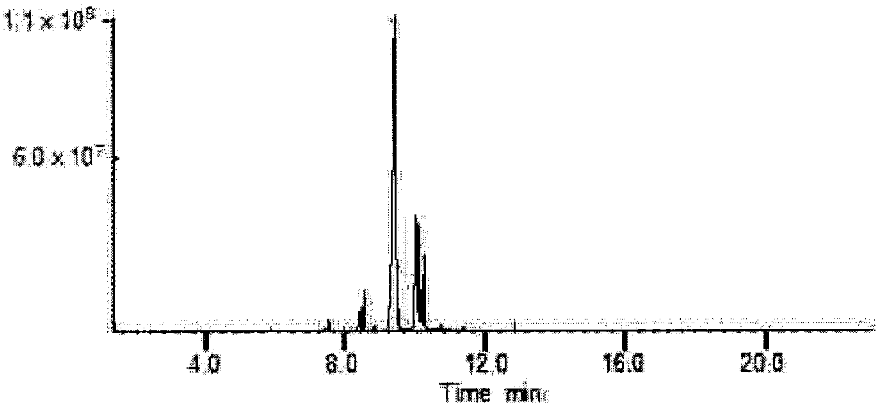

In FIG. 10, GC/MS chromatograms of DPX extracts of stomach contents is shown with and without the use of DPX-CU. Without DPX-CU (B), the chromatogram is characterized with intense peaks associated with sample matrix compounds predominantly consisting of fatty acids. These peaks interfere with the analysis of potentially co-eluting peaks of analytes of interest. The chromatogram obtained following the use of DPX-CU (A) demonstrates no interfering peaks, even with the scale of the y-axis at approximately 50 times less ($4.5\times10^6$ in A compared to $1.1\times10^8$ in B).

Example 5

Figure 11A:
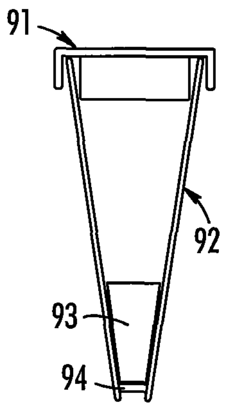
FIG. 11 shows a sample collection tip (SC-Tip) demonstrating the ability of the pipette extraction tips with adaptors to be used for field collection of samples as well as for sample processing.

In FIG. 11A, 1 mL of whole blood is collected by a forensic pathologist and injected onto the top of the SC-Tip 92 that is bar code labeled and contains absorbent material and a screen 94. The cap 91, which also acts as a transport adaptor, is securely placed on the SC-Tip and evidence tape is placed over it, and his initials and time are subsequently written on the tape and evidence submission form (with corresponding bar code label). The adaptor and top of the pipette tip may be threaded to be used as a screw cap. A small plug or cap at the bottom (narrow end) of the tip may also be used to provide a complete seal of the DPX-collection tip. The sample may also be a cotton swab (B), or similar material for collecting samples. The evidence is shipped to the laboratory for testing. Once the evidence is received, the SC-Tip is immediately scanned with a bar code scanner and placed in a rack to be processed robotically without any manual transferring of the evidence. The chain-of-custody begins with the sample collection (pathologist) and ends with the chemical analysis without any other "links" in the chain. The analysis is initiated almost as soon as the sample is received with little to no downtime in order to facilitate case turnaround time.

Example 6

A law enforcement officer makes a routine traffic stop and notices a bag of suspect powder material. He places a small spatula full of this sample into a SC-Tip (bar code labeled), places the cap or adaptor onto the tip, attaches evidence tape, and writes his initials and time/date onto the evidence tape and corresponding evidence submission form. (He also maintains the rest of the evidence to be weighed and re-analyzed if necessary). The evidence is shipped to the laboratory, and the SC-Tip is immediately processed robotically without any delays. The analysis is initiated before the evidence paper work is submitted into the computer or laboratory information management system.

Example 7

Figure 11B:
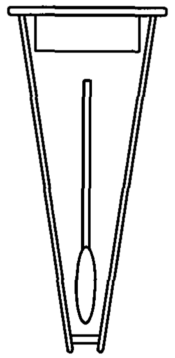

In FIG. 11B, a swab of sample is contained inside of the SC-Tip. The swab may be directly processed using robotics for the analysis of 1) DNA collected from suspects (or criminals); 2) drugs from oral fluid collected; and 3) gunshot residue particles from hands of firearm suspects. The robotics may be coupled to capillary electrophoresis, GC-MS or HPLC-MS/MS, or ICP or ICP/MS instrumentation for the analysis of DNA, drugs or explosives, or gunshot residue particles, respectively.

Those with ordinary skill in this area will recognize that the invention is not limited to the specific embodiments described above, but it also includes variations that are equivalent to the invention disclosed herein.

The invention claimed is:

1. A pipette tip system, comprising:

a positive or negative pressure device;

an upper adaptor including an entry, wherein said entry is a pierceable membrane, wherein said pierceable membrane is nonporous and adapted to be pierced by said positive or negative pressure device, and wherein said upper adaptor forms an air tight seal with said positive or negative pressure device when said positive or negative pressure device pierces said pierceable membrane;

a lower liquid permeable closure;

a mixing chamber between said upper adaptor and said lower liquid permeable closure; and sorbent materials within said mixing chamber contained loosely enough so that said sorbent materials are moveable for mixing.

2. The pipette tip as recited in claim 1, wherein said upper adaptor includes grooves for transporting said pipette tip by an automated instrument.

3. The pipette tip in claim 1, wherein said adaptor is removable.

4. The pipette tip in claim 1, wherein said lower liquid permeable closure is a filtration membrane or screen.

5. The pipette tip in claim 1, wherein said positive or negative pressure device is a syringe having a needle.

6. The pipette tip in claim 1, further comprising an upper barrier below said adaptor.

7. A pipette tip system, comprising:

a positive or negative pressure device;

a pipette tip having an upper end and a lower end;

an adaptor at said upper end including an entry having a pierceable membrane adapted to be pierced by said positive or negative pressure device, wherein said pierceable membrane is nonporous and forms an air tight seal with said positive and negative pressure device;

a lower liquid permeable closure;

a mixing chamber between said upper adaptor and said lower liquid permeable closure; and sorbent material contained loosely within said mixing chamber to allow for movement of said sorbent material.

8. The pipette tip in claim 7, further comprising an upper barrier below said adaptor.

9. The pipette tip in claim 7, wherein said positive or negative pressure device is a syringe having a needle.

* * * * *